United States Patent
Zhang et al.

(10) Patent No.: US 12,289,448 B2
(45) Date of Patent: *Apr. 29, 2025

(54) POINT CLOUD CODING METHODS, ENCODER, AND DECODER

(71) Applicant: GUANGDONG OPPO MOBILE TELECOMMUNICATIONS CORP., LTD., Guangdong (CN)

(72) Inventors: Wei Zhang, Guangdong (CN); Fuzheng Yang, Guangdong (CN); Shuai Wan, Guangdong (CN); Yanzhuo Ma, Guangdong (CN); Junyan Huo, Guangdong (CN); Zexing Sun, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/449,874

(22) Filed: Aug. 15, 2023

(65) Prior Publication Data

US 2023/0388497 A1 Nov. 30, 2023

Related U.S. Application Data

(63) Continuation of application No. 17/931,272, filed on Sep. 12, 2022, now Pat. No. 11,785,216, which is a
(Continued)

(51) Int. Cl.
*H04N 19/119* (2014.01)
*H04N 19/597* (2014.01)

(52) U.S. Cl.
CPC ......... *H04N 19/119* (2014.11); *H04N 19/597* (2014.11)

(58) Field of Classification Search
CPC .. H04N 19/119; H04N 19/597; H04N 19/136; H04N 19/30; H04N 19/593;
(Continued)

(56) References Cited

U.S. PATENT DOCUMENTS 11,483,560 B2 * 10/2022 Zhang ................ G06T 7/50
11,785,216 B2 * 10/2023 Zhang ................ H04N 19/119
375/240.12
(Continued)

FOREIGN PATENT DOCUMENTS

CN 102436654 A 5/2012
CN 103077549 A 5/2013
(Continued)

OTHER PUBLICATIONS

Hearing Notice issued in corresponding IN application No. 202217018327 dated Feb. 21, 2024. 3 pages.
(Continued)

*Primary Examiner* — Tat C Chio
(74) *Attorney, Agent, or Firm* — PERKINS COIE LLP

(57) ABSTRACT

Point cloud coding methods, an encoder, and a decoder are provided. The method includes the following. Morton codes for a point cloud are obtained according to geometry information of the point cloud after geometry decoding is completed and the geometry information is reconstructed. A value of K is determined according to a distribution of the point cloud, where K is a positive integer, where K is a positive integer. The point cloud is determined as an input point cloud of an iteration. Morton codes for an input point cloud of an i-th iteration are right shifted by K bits according to a number of points in the input point cloud of the i-th iteration. An i-th level of detail (LOD) layer is formed with a point selected after the Morton codes are shifted. Color information is decoded according to the LOD layer.

20 Claims, 9 Drawing Sheets

Related U.S. Application Data continuation of application No. 17/702,674, filed on Mar. 23, 2022, now Pat. No. 11,483,560, which is a continuation of application No. PCT/CN2019/109653, filed on Sep. 30, 2019.

(58) Field of Classification Search
CPC .. G06T 9/001; G06T 9/40; G06T 7/50; G06T 17/005; G06T 2207/10028
See application file for complete search history.

(56) References Cited

U.S. PATENT DOCUMENTS

| | | | |
|---|---|---|---|
| 2008/0238919 | A1 | 10/2008 | Pack |
| 2015/0113379 | A1 | 4/2015 | Wakefield et al. |
| 2019/0080483 | A1* | 3/2019 | Mammou ............. G06T 3/4007 |
| 2019/0081638 | A1 | 3/2019 | Mammou et al. |
| 2022/0210471 | A1 | 6/2022 | Zhang et al. |

FOREIGN PATENT DOCUMENTS

| | | |
|---|---|---|
| CN | 108470374 A | 8/2018 |
| CN | 109257604 A | 1/2019 |
| CN | 109886272 A | 6/2019 |
| CN | 109889840 A | 6/2019 |

OTHER PUBLICATIONS

Chou, Phip A., et al., Microsoft, Transform Coder for Point Cloud Attributes—ISO/IEC JTC1/SC29/WG11 MPEG2016/m38674—May 2016, Geneva, Switzerland. 10 pages.
First examination report issued in corresponding IN application No. 202217018327 dated Aug. 22, 2022 with English translation (6 pages).
Hubo, Erik et al. "The Quantized kd-Tree: Efficient Ray Tracing of Compressed Point Clouds", IEEE Symposium on Interactive Ray Tracing, Sep. 20, 2006. 9 pages.
International search report issued in corresponding international application No. PCT/CN2019/109653 dated Jun. 29, 2020.
Mammou, Khaled, 3DG, PCC Test Model Category 3 v0—ISO/IEC JTC1/SC29/WG11 N17249—Oct. 2017, Macau, Chinaw. 8 pages.
Mammou, Khaled, et al., 3DG, G-PCC codec description v2—w18189—ISO/IEC JTC1/SC29/WG11 N18189—Jan. 2019, Marrakech, MA. 39 pages.
Mammou, Khaled, et al., 3DG, PCC Test Model Category 13 v2—ISO/IEC JTC1/SC29/WG11 N17519—Apr. 2018, San Diego, USA. 13 pages.
Mammou, Khaled, et al., 3DG, PCC Test Model Category 13 v3—ISO/IEC JTC1/SC29/WG11 N17762—Jul. 2018, Ljubljana, Slovenia. 18 pages.
Mammou, Khaled, et al., Apple Inc., Efficient implementation of the Lifting Scheme in TMC13—ISO/IEC JTC1/SC29/WG11 MPEG2018/m43781—Jul. 2018, Ljubljana, Slovenia. 4 pages.
Non-Final Office Action issued Feb. 10, 2023 of U.S. Appl. No. 17/931,272, filed Sep. 12, 2022.
Notice of Allowance for U.S. Appl. No. 17/702,674, mailed Jun. 22, 2022.
Notice of Allowance issued Jun. 9, 2023 of U.S. Appl. No. 17/931,272, filed Sep. 12, 2022.
Yang Zhenfa et al. "Research on Rendering of Massive Point Cloud Based on Multi-resolution LOD", Geospatial Information, vol. 14, No. 10, Oct. 31, 2016. 13 pages with English translation.
Request for the Submission of an Opinion issued in corresponding KR application No. 10-2022-7011834 dated Nov. 20, 2023. 8 pages with English translation.
Zhao Erping, et al. "Data Compression and Spatial Indexing Technology for Massive 3D Point Cloud", Journal of Computer Applications, dated Jan. 10, 2018. 7 pages with English translation of abstract.
First Office Action issued in corresponding CN application No. 202210356934.3 dated Jul. 26, 2024. 17 pages with English translation.

* cited by examiner

POINT CLOUD CODING METHODS, ENCODER, AND DECODER

CROSS-REFERENCE TO RELATED APPLICATION(S)

This application is a continuation of U.S. patent application Ser. No. 17/931,272, filed Sep. 12, 2022, which is a continuation of U.S. patent application Ser. No. 17/702,674, filed Mar. 23, 2022, now U.S. Pat. No. 11,483,560, issued Oct. 25, 2022, which claims priority to International Application No. PCT/CN2019/109653, filed Sep. 30, 2019, the entire disclosures of which are hereby incorporated by reference.

TECHNICAL FIELD

Implementations of this application relates to level of detail (LOD) partition technology in geometry-based point cloud compression (G-PCC) coding, and in particular to point cloud coding methods, an encoder, and a decoder.

BACKGROUND

In an encoder framework of geometry-based point cloud compression (G-PCC), geometry information of a point cloud and attribute information corresponding to each point in the point cloud are encoded separately. Geometry encoding is first performed. After geometry encoding is completed, geometry information is reconstructed. Currently, attribute encoding is mainly for color information. In attribute encoding, the color information is first transformed from a RGB color space to a YUV color space. Thereafter, the reconstructed geometry information is used to recolor the point cloud, so that un-encoded attribute information can correspond to the reconstructed geometry information. During encoding of the color information, there are mainly two transform methods. One is level of detail (LOD) partition-based lifting transform. At present, the LOD partition mainly includes distance-based LOD partition and fixed sampling rate-based LOD partition. The other is regional adaptive hierarchical transform (RAHT) which is performed directly on the attribute information.

Due to high computational complexity of the distance-based LOD partition for the point cloud, in order to reduce computational complexity, a method of searching within a range of Morton code corresponding to a current point is used on the basis of the distance-based LOD partition. However, in video coding, after the LOD partition is completed, a partition structure of LODs is required to predict an attribute of a neighbor node. LOD layers obtained by the existing LOD partition method may result in a low prediction accuracy for neighbor nodes.

SUMMARY

Implementations of this application provide point cloud coding methods, an encoder and a decoder.

In a first aspect, implementations of this application provide a point cloud decoding method which is applied for a decoder. The method includes the following.

Morton codes for a point cloud are obtained according to geometry information of the point cloud after geometry decoding is completed and the geometry information is reconstructed. A value of K is determined according to a distribution of the point cloud, where K is a positive integer. The point cloud is determined as an input point cloud of an iteration. Morton codes for an input point cloud of an i-th iteration are right shifted by K bits according to a number of points in the input point cloud of the i-th iteration. An i-th level of detail (LOD) layer is formed with a point selected after the Morton codes are shifted. Color information is decoded according to the LOD layer.

In a second aspect, implementations of this application provide a point cloud encoding method which is applied for an encoder. The method includes the following.

Morton codes for a point cloud are obtained according to geometry information of the point cloud after geometry encoding is completed and the geometry information is reconstructed. A value of K is determined according to a distribution of the point cloud, where K is a positive integer. The point cloud is determined as an input point cloud of an iteration. Morton codes for an input point cloud of an i-th iteration are right shifted by K bits according to a number of points in the input point cloud of the i-th iteration. An i-th level of detail (LOD) layer is formed with a point selected after the Morton codes are shifted. Color information is encoded according to the LOD layer.

In a third aspect, implementations of this application provide an encoder. The encoder includes a processor and a memory storing a computer program which, when executed by the processor, causes the processor to execute the point cloud decoding method of the second aspect.

In a fourth aspect, implementations of this application provide a decoder. The decoder includes a processor and a memory storing a computer program which, when executed by the processor, causes the processor to execute the point cloud encoding method of the first aspect.

DETAILED DESCRIPTION

Figure 1:
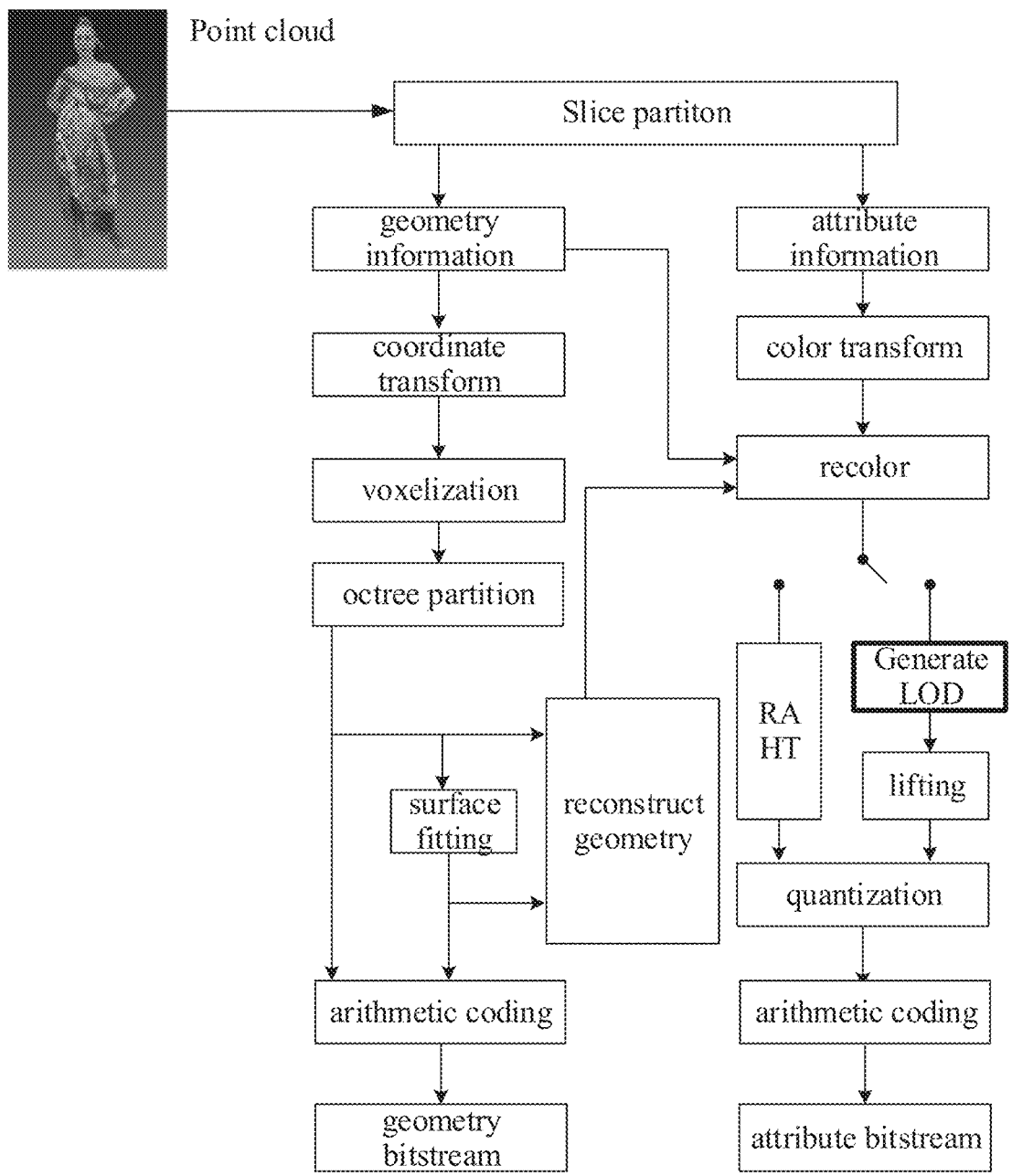
FIG. 1 is a block diagram of a process of geometry-based point cloud compression (G-PCC) encoding.

Technical solutions in implementations of this application will be clearly and completely described below with reference to accompanying drawings in the implementations of this application. It should be understood that the specific implementations described herein are only used to explain the related application, but not to limit the application. In addition, it should be noted that, for the convenience of description, only the parts related to the relevant application are illustrated in the drawings.

In implementations of this application, in an encoder framework of geometry-based point cloud compression (G-PCC) of point cloud, after a point cloud of an input three-dimensional image model is partitioned into slices, each slice is encoded independently.

FIG. 1 is a block diagram of a process of G-PCC encoding. As illustrated in FIG. 1, the process is applied to a point cloud encoder. For point cloud data to-be-encoded, through slice partition, the point cloud data is first partitioned into multiple slices. In each slice, geometry information of the point cloud and attribute information corresponding to each point in the point cloud are encoded separately. In geometry encoding, coordinate transform is performed on the geometry information so that the whole point cloud is contained in a bounding box. Then quantification is performed, which mainly plays a role of scaling. Due to the rounding of quantification, the geometry information of part of the point cloud is the same. Then whether to remove duplicate points is decided based on parameters. The process of quantifying and removing the duplicate points is also called voxelization. Thereafter, octree partition is performed on the bounding box. During octree-based encoding of the geometry information, the bounding box is equally partitioned into eight sub-cubes, and non-empty (including points in the point cloud) sub-cubes continue to be partitioned into eight equal parts until leaf nodes obtained through partition are 1×1×1 unit cubes. Arithmetic coding is performed on points in the leaf nodes to generate a binary geometry bitstream, that is, geometry code stream. During encoding of the geometry information based on triangle soup (trisoup), octree partition is also performed first. Different from the octree-based encoding of the geometry information, the trisoup does not need to partition the point cloud step by step into unit cubes each with an edge length of 1×1×1, but stops partition when blocks each with an edge length of W are obtained. Based on a surface formed based on distribution of a point cloud in each block, at most twelve vertexes generated by both the surface and twelve edges of the block are obtained. Arithmetic coding is performed on the vertexes (surface fitting based on vertexes), to generate a binary geometry bitstream, that is, geometry code stream. The vertexes are also used in implementation of geometry reconstruction and reconstructed geometry information is used in attribute coding of the point cloud.

During attribute coding, after the geometry coding is completed and the geometry information is reconstructed, color transform is performed, that is, color information (i.e., the attribute information) is transformed from a RGB color space to a YUV color space. Thereafter, the reconstructed geometry information is used to recolor the point cloud, so that un-encoded attribute information can correspond to the reconstructed geometry information. During encoding of the color information, there are mainly two transform methods. One is distance-based lifting transform which relies on level of detail (LOD) partition. The other is regional adaptive hierarchical transform (RAHT). Both methods transform the color information from a spatial domain to a frequency domain, obtain high-frequency coefficients and low-frequency coefficients through transform, and finally quantize the coefficients (i.e., quantized coefficients). At last, geometry encoded data after octree partition and surface fitting and attribute encoded data after quantized coefficient processing are slice-synthesized, and vertex coordinates of each block are encoded in turn (that is, arithmetic coding), to generate a binary attribute bitstream, that is, attribute code stream.

In related art, a distance-based LOD partition method is proposed for Category3 point cloud in attribute transform. The distance-based LOD partition method is applied to a TMC3V0 encoder and used in TMC13 attribute lifting transform. The distance-based method for LOD partition is also added in TMC13 attribute predicting transform. That is, LOD partition is applied in both point cloud attribute predicting transform and lifting transform.

Specifically, the distance-based LOD partition is implemented as follows.

In the LOD partition, an input point cloud is partitioned into different refinement levels $R_l$ by a set of defined distance thresholds, where l=0, . . . , L−1. That is, points in the point cloud is partitioned into different sets $R_l$. The distance thresholds $d_l$ need to satisfy the following two conditions:

$$d_l < d_{l-1} \tag{1}$$

$$d_{L-1} = 0 \tag{2}$$

Specifically, the process of LOD partition is after the geometry reconstruction of the point cloud. At this time, the geometry coordinate information of the point cloud is known. The process of LOD partition is applied at both the encoder side and the decoder side for the point cloud. The process proceeds as follows:

1) First, all the points in the point cloud are placed in a "non-visited" point set and a "visited" point set V is initialized as empty.
2) The algorithm partitions LOD layers by iteration. At an iteration l, a corresponding refinement level $R_l$ is generated as follows:
   a. The algorithm traverses all the points by iteration.
   b. If the current point has been traversed, then it is ignored.
   c. Otherwise, a distance from the current point to each point in the set V is computed respectively, and a minimum distance is denoted as D, where at the first iteration, the first point in the point cloud is added in the set V.
   d. If the distance D is greater than or equal to the threshold di, then the point is added to the refinement level $R_l$ and the set V.
   e. c-d are repeated until all the points are traversed.
3) The l-th LOD set, that is, LOD/is obtained by taking the union of points in the refinement levels $R_0, R_1, \ldots, R_l$.
4) This process is iterated until all the LOD layers are generated or until all the points have been traversed.

Figure 2:
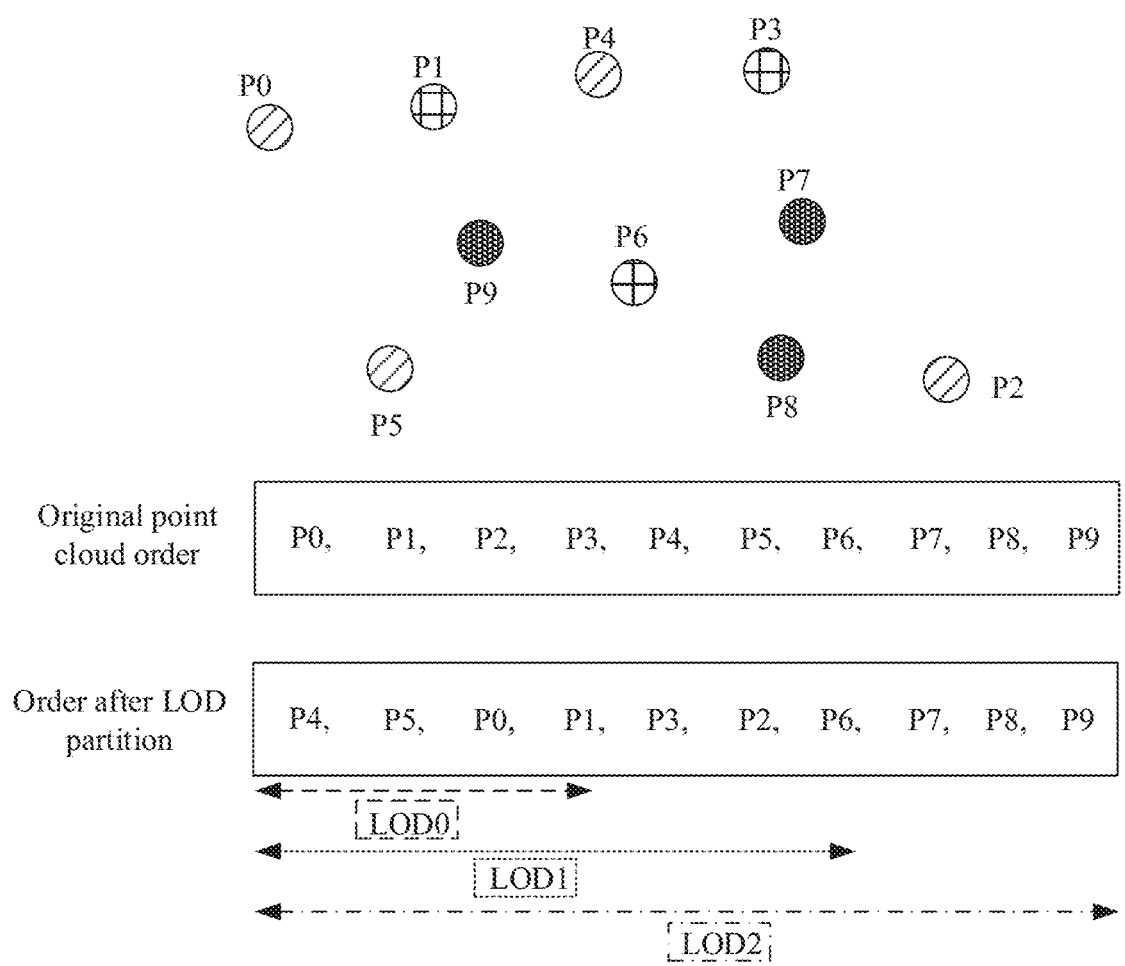
FIG. 2 is a schematic diagram of a process of distance-based level of detail (LOD) partition.

FIG. 2 is a schematic diagram of a process of distance-based LOD partition. As illustrated in FIG. 2, a current point cloud to-be-partitioned includes points P0, P1, P2, P3, P4, P5, P6, P7, P8, and P9, where an original point cloud order is: P0, P1, P2, P3, P4, P5, P6, P7, P8, and P9. LOD0 obtained by the distance-based method for LOD partition includes P4, P5, P0, and P1, LOD1 includes P4, P5, P0, P1, P3, P2, and P6, and LOD2 includes P4, P5, P0, P1, P3, P2, P6, P7, P8, and P9.

In related art, a scheme for reducing computational complexity of LOD generation is also proposed, which mainly partitions LODs based on Morton order. Morton code realizes conversion of one-dimension and two-dimension (or multi-dimension), which produces a number by interleaving storage of the bits of two numbers. This scheme has a significantly reduced computational complexity compared to the original scheme which searching for all points to partition LODs. This scheme mainly includes the following steps.

First, assume variable $P_i$ and $M_i$, where $P_i$ represents a point in an input point cloud, i=1, ..., N, and $M_i$ represents a Morton code associated with each point, i=1, ..., N. Specifically, the Morton code is computed as follows. For each point, three-dimensional (3D) coordinate components x, y, z are expressed using a d-bits binary number as follows:

$$x = \sum_{l=1}^{d} 2^{d-l} \cdot x_l \quad (3)$$

$$y = \sum_{l=1}^{d} 2^{d-l} \cdot y_l \quad (4)$$

$$z = \sum_{l=1}^{d} 2^{d-l} \cdot z_l \quad (5)$$

Where $x_l, y_l, z_l \in \{0, 1\}$, and $x_l, y_l, z_l$ are corresponding binary values from the most significant bits (l=1) to the least significant bits (l=d) of x, y, z. The Morton code M is obtained by interleaving $x_l, y_l, z_l$ from the most significant bits to the least significant bits for x, y, z. M is computed using the following equation:

$$M = \sum_{l=1}^{d} 2^{3(d-l)} \cdot (4x_l + 2y_l + z_l) = \sum_{l'=1}^{3d} 2^{3d-l'} \cdot m_{l'} \quad (6)$$

Where $m_i \in \{0,1\}$ are the values from the most significant bit (l'=1) to the least significant bit (l'=3d) of M. After the Morton code M of each point in the point cloud is obtained, the points in the point cloud are ranked in an ascending order of Morton codes.

D0 (representing a threshold of an initial distance) and ρ (representing a distance threshold ratio in partition of adjacent LOD layers) are user-defined initial parameters respectively, and ρ>1. Let I be indexes of all points in the point cloud. At the k-th iteration, a closest neighbor of a point in $LOD_k$, that is, a point closest to the point in $LOD_k$, will be searched from $LOD_0$ layer to $LOD_{k-1}$ layer. Specifically, the algorithm proceeds as follows:

1) First, initial a partition distance threshold $D=D_0$;
2) At the k-th iteration, where k=0, 1 ... N−1 (N is the total number of layers in LOD partition), L(k) stores points belong to the k-th LOD layer, and O(k) stores a point set with higher refinement level than $LOD_k$, where L(k) and O(k) are computed as follows:
    a. First, O(k) and L(k) are initialized as empty sets;
    b. At each iteration, points are traversed in order of point indexes stored in I. Geometric distances from a current point to all points within a certain range in the set O(k) are computed during each traversal. Based on a Morton code corresponding to the current point in I, search in the set O(k) for the first point with an index that is greater than the Morton code corresponding to the current point, and then search in a range SR1 of the index (SR1 represents a search range based on Morton code, which is generally 8, 16, or 64). If a point whose distance from the current point is smaller than the threshold $d_l$ is searched out in the range, the current point is added to the set L(k). Otherwise, the current point is added to the set O(k);
3) At each iteration, the sets L(k) and O(k) are computed respectively, and points in O(k) will be used for predicting points in L(k). Let R(k)=L(k)\L(k−1), that is, R(k) represents a point set of differences between sets of $LOD_{k-1}$ and $LOD_k$. For a point in R(k), h nearest predicting neighbors (h is set to 3 currently) will be searched in O(k). The nearest neighbors are searched as follows:
    a. For point $P_i$ in R(k), let $M_i$ be the Morton code corresponding to the point;
    b. Search in O(k) for the first point index j which is greater than the Morton code $M_i$ of current point $P_i$;
    c. Based on the index j, search nearest neighbor nodes of current point $P_i$ in a search range [j−SR2, j+SR2] in O(k), where SR2 represents a search range which is generally 8/16/32/64.
4) This process is iterated until all points in I are traversed.

Figure 3:
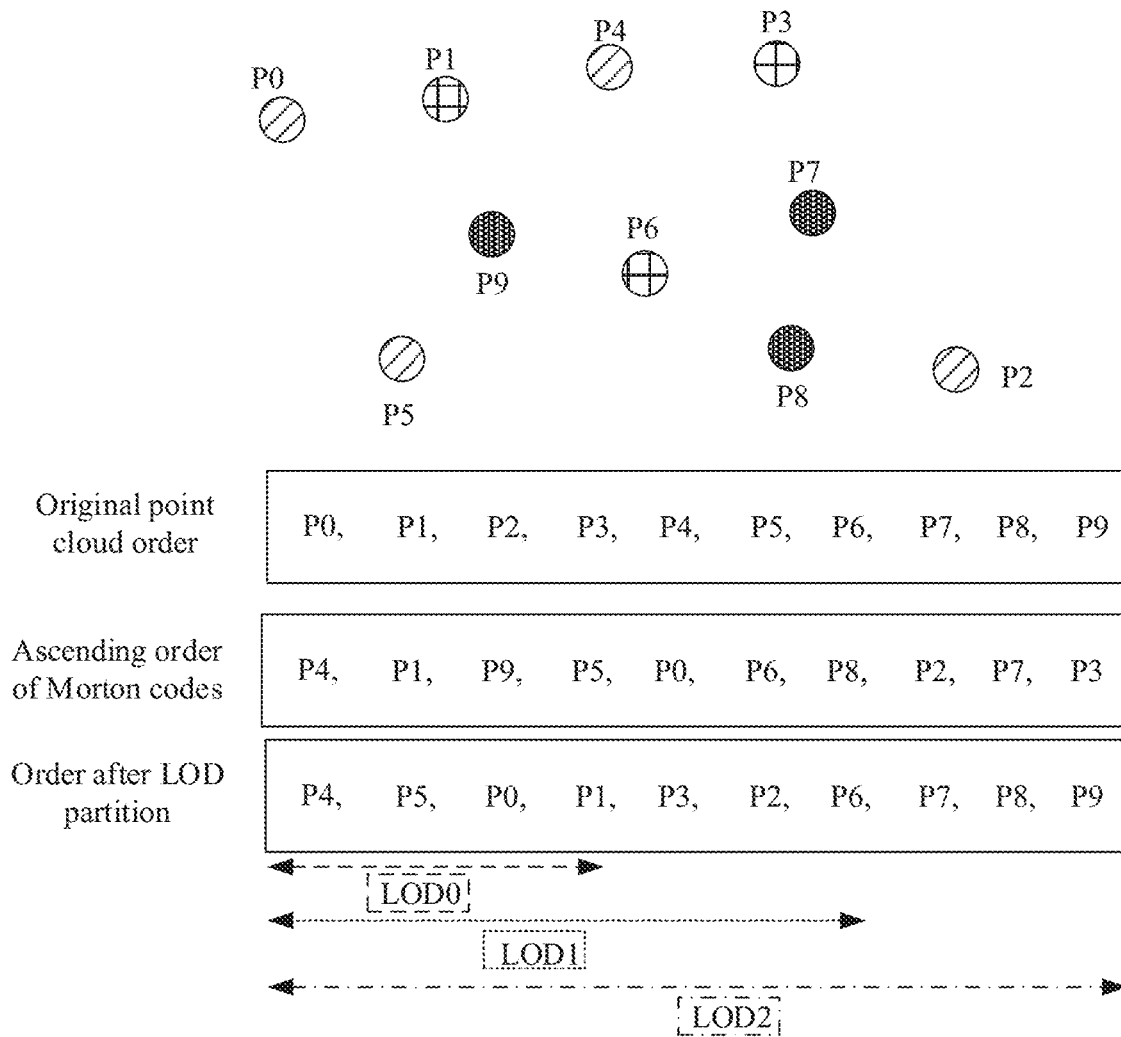
FIG. 3 is a schematic diagram of a process of Morton order-based LOD partition.

FIG. 3 is a schematic diagram of a process of Morton order-based LOD partition. As illustrated in FIG. 3, a point cloud to-be-partitioned includes points P0, P1, P2, P3, P4, P5, P6, P7, P8, and P9, where an original point cloud order is P0, P1, P2, P3, P4, P5, P6, P7, P8, and P9. The points listed in ascending Morton order are: P4, P1, P9, P5, P0, P6, P8, P2, P7, and P3. $LOD_0$ obtained by the above Morton order-based LOD partition method includes P4, P5, P0, and P1, LOD1 includes P4, P5, P0, P1, P3, P2, and P6, and LOD2 includes P4, P5, P0, P1, P3, P2, P6, P7, P8, and P9.

The distance-based LOD partition method searches within a range of the Morton code corresponding to the current point, calculates spatial geometric distances from points in the range to the current point, and comparing the distances with a threshold. Until the distances of all points are greater than the threshold, the current point is added to the current LOD layer. Otherwise, the current point is left to the next layer for partition. The test data obtained through testing shows that the time used by the distance-based LOD partition method occupies about 70%~80% of the total coding time. Obviously, the computational complexity is high.

In addition, before the point cloud attribute predicting and lifting transform, the point cloud is partitioned into LODs based on distance. Since there is a great correlation between attributes of adjacent points in the space, the LOD-based structure can be used to predict the attributes of adjacent nodes, so as to remove attribute redundancy between adjacent points. However, since different point clouds have different spatial distributions, the densities of different point clouds are different. Therefore, in the LOD partition process based on distance in the related art, the neighbor points obtained by searching based on uniform distribution of the point cloud (equivalent to the distance thresholds for partition are the same) are not accurate enough, resulting in large prediction residuals and low coding efficiency.

Duce to the high computational complexity of distance-based LOD partition of point clouds, in order to reduce the computational complexity, the method of searching within a range of Morton code corresponding to the current point is used on a basic of distance-based LOD partition. However, in video coding, after the LOD partition is completed, the LOD partition structure is required to predict attributes of neighbor nodes. Since different point clouds have different spatial distributions, the densities of different point clouds are different. Therefore, the LOD partition structure obtained through the partition method cannot accurately predict neighbor nodes, resulting in large prediction residuals and low coding efficiency. As can be seen, the LOD layers obtained through the current LOD partition method lead to a low prediction accuracy of neighbor nodes.

Figure 4A:
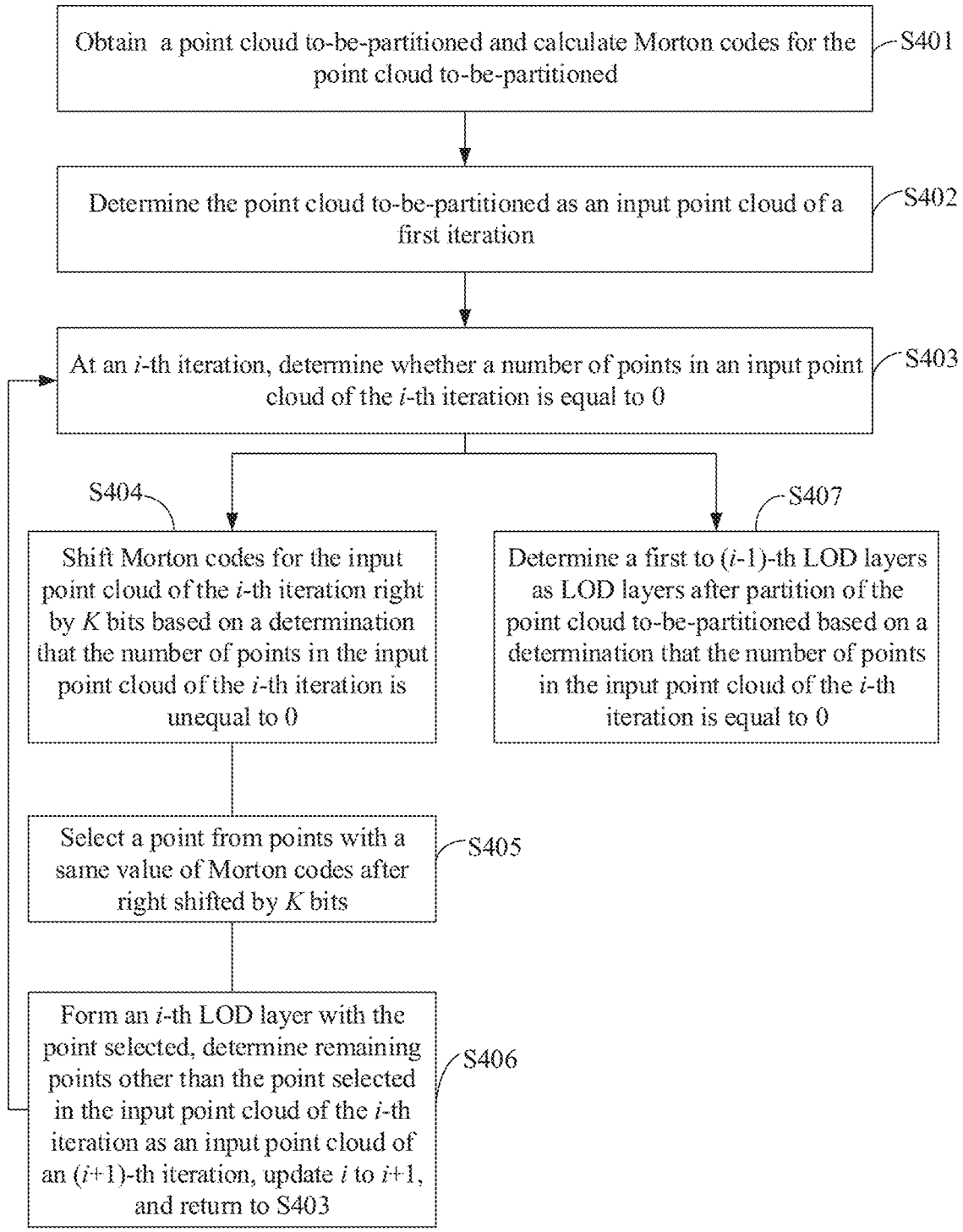
FIG. 4A is a schematic flowchart of an optional partition method provided in implementations of this application.

In order to improve the coding efficiency, prediction accuracy of neighbor nodes needs to be improved. In order to improve the prediction accuracy of neighbor nodes, a partition method is provided in implementations of this application. FIG. 4A is a schematic flowchart of an optional partition method provided in implementations of this application. As illustrated in FIG. 4A, the method can be applied to an encoder or a decoder. The partition method includes the following.

At S401, a point cloud to-be-partitioned is obtained and Morton codes for the point cloud to-be-partitioned is calculated.

The partition method provided in implementations of this application improves the generation process of LODs in lifting and predicting attribute transform and applies to the encoder and the decoder. The method partitions the LOD structure using this improved technology before lifting or predicting transform. This method applies in the block of generating LOD in FIG. 1.

Here, after the point cloud to-be-partitioned is obtained, the Morton codes for the point cloud to-be-partitioned is first calculated. In subsequent iterative calculation, spatial position relationship between points can be known with the Morton codes, which facilitates to predict neighbor nodes after partition of LOD layers.

At S402, the point cloud to-be-partitioned is determined as an input point cloud of a first iteration.

Specifically, in order to partition the point cloud to-be-partitioned into LOD layers, iteration is applied herein for partition. First, the point cloud to-be-partitioned is obtained, which includes at least two points, such as 10 points. The point cloud to-be-partitioned is determined as the input point cloud of the first iteration.

In case that there are a large number of points in the point cloud to-be-partitioned, in order to better and quickly perform LOD partition on the point cloud to-be-partitioned, in one optional implementation, the method may include the following before S402.

The Morton codes for the point cloud to-be-partitioned are shifted right by N bits and points with a same value of Morton codes after right shifted by N bits are grouped into a point cloud group, where N is a positive integer. Each point cloud group is determined as the input point cloud of the first iteration respectively.

That is, when the number of points in the point cloud to-be-partitioned is relatively large, the point cloud to-be-partitioned is not directly used as the input point cloud of the first iteration. Instead, the Morton codes for the point cloud to-be-partitioned is first calculated and then right shifted by N bits. In this way, the points with the same value of Morton codes after right shifted by N bits are adjacent spatially. Therefore, the points with the same value of Morton codes after right shifted by N bits are grouped into a point cloud group and each point cloud group is determined as the input point cloud of the first iteration respectively. As such, the point cloud to-be-partitioned is divided into groups and each point cloud group is used as the input point cloud of the first iteration respectively for iterative calculation. Finally, LOD layers after partition of each point cloud group are obtained, such that LOD layers after partition of the point cloud to-be-partitioned are obtained.

At S403, at an i-th iteration, whether a number of points in an input point cloud of the i-th iteration is equal to 0 is determined.

In implementations of this application, iteration times are indexed with i, where i is a positive integer with an initial value equal to 1.

At S403, at each iteration, whether the number of points in the input point cloud of each iteration is equal to 0 is first determined. That is, whether the point cloud to-be-partitioned is all traversed through iteration is determined. The iteration process ends if the traversals are completed. If the traversals are not completed, the iteration process proceeds to partition the point cloud to-be-partitioned into LOD layers.

At S404, Morton codes for the input point cloud of the i-th iteration are shifted right by K bits based on a determination that the number of points in the input point cloud of the i-th iteration is unequal to 0.

With the determination at S403, when the number of points in the input point cloud of the i-th iteration is unequal to 0, which indicates that the previous iteration has not traversed all the points, the i-th iteration needs to proceed. Specifically, the points can be ranked in an ascending order of Morton codes so as to better obtain spatial relationships between the points through the Morton codes.

K is a positive integer. The value of K herein may be a fixed value obtained through training, or may be a value obtained by any of the following methods, which is not specifically limited in implementations of the this application.

In order to determine the value of K, in a possible implementation, the method may further include the following before S404.

The value of K is determined according to a distribution of the point cloud to-be-partitioned.

Specifically, the value of K is determined according to the distribution of the point cloud to-be-partitioned. As such, the Morton codes are right shifted by K bit at each iteration, so that the spatial distribution of the point cloud is considered in right-shifting of the Morton codes, which can achieve a better prediction effect.

In order to determine the value of K, in a possible implementation, when i is greater than or equal to a first preset threshold, the method may further include the following before S404.

The value of K is determined according to a number of points in the input point cloud of the i-th iteration and a distribution of the input point cloud of the i-th iteration.

Since a part of point cloud will be partitioned into a corresponding LOD layer at each iteration, as the number of iterations increases, the number of remaining points decreases, and the distribution of the input point cloud of each iteration is changing. In order to achieve a better prediction effect, the value of K of each iteration can be determined according to the number of points in the input point cloud of each iteration and the distribution of the input point cloud of each iteration. In this way, for the number of bits of right-shifting of the Morton codes at each iteration, the number of points and the spatial distribution of the point cloud are considered, which can achieve a better prediction effect.

At S405, a point is selected from points with a same value of Morton codes after right shifted by K bits.

After the Morton codes are right shifted by K bits, in order to partition into LOD layers, the points with the same value of Morton codes after right shifted by K bits are found, such that at least one group of points with the same value of Morton codes after right shifted by K bits is obtained. Then a point is selected from points with the same value of Morton codes after right shifted by K bits. Any point or a specified point may be selected, which is not specifically limited in implementations of this application.

In order to obtain partitioned LOD layers to improve prediction accuracy of neighbor nodes, in an optional implementation, S405 may include the following.

Points in the input point cloud of the i-th iteration are ranked in an ascending order of Morton codes for the input point cloud of the i-th iteration. A point ranked first is selected from the points with the same value of Morton codes after right shifted by K bits.

The points are ranked in an ascending order of Morton codes and the points with the same value of Morton codes after right shifted by K bits are found, such that at least one group of points with the same value of Morton codes after right shifted by K bits is obtained. Thereafter, the first point is selected from each group, where the first point is the point ranked first in an original point cloud order among the points with the same value of Morton codes after right shifted by K bits.

In order to obtain partitioned LOD layers to improve prediction accuracy of neighbor nodes, in an optional implementation, S405 may include the following.

A center of mass of the points with the same value of Morton codes after right shifted by K bits is determined. From the points with the same value of Morton codes after right shifted by K bits, a point closest to the center of mass is determined as the point selected.

Specifically, the center of mass of the points with the same value of Morton codes after right shifted by K bits is first determined, where the center of mass is calculated according to 3D coordinates of each point in the input point cloud of this iteration. After the center of mass is obtained, the point closest to the center of mass is calculated from the points with the same value of Morton codes after right shifted by K bits, and the point is selected.

In order to obtain partitioned LOD layers to improve prediction accuracy of neighbor nodes, in addition to selecting the point through S405, in an optional implementation, the method may further include the following after S404 and before S406.

A corresponding selection number is determined according to a number of points with the same value of Morton codes after right shifted by K bits. From the points with the same value of Morton codes after right shifted by K bits, the selection number of points are selected according to the corresponding selection number.

Specifically, more than one point can be selected from the points with the same value of Morton codes after right shifted by K bits. The corresponding selection number can be first determined according to the number of points with the same value of Morton codes after right shifted by K bits. For example, the number of points with the same value of Morton codes after right shifted by K bits may be 10, 8, 6, 4, etc. The corresponding selection number can be determined according to the number of points with the same value of Morton codes. For instance, if the number of points with the same value of Morton codes after right shifted by K bits is 10, the corresponding selection number may be 5. If the number of points with the same value of Morton codes after right shifted by K bits is 8, the corresponding selection number may be 4. If the number of points with the same value of Morton codes after right shifted by K bits is 6, the corresponding selection number may be 3. If the number of points with the same value of Morton codes after right shifted by K bits is 4, the corresponding selection number may be 2. That is, the corresponding selection number can be determined according to a proportional relationship.

Thereafter, the selection number of points are selected from the points with the same value of Morton codes after right shifted by K bits according to the selection number. The selection number of points may be selected arbitrarily or in a specified manner, which is not specifically limited in implementations of this application.

In order to obtain partitioned LOD layers to improve prediction accuracy of neighbor nodes, in addition to selecting the point through S405, in an optional implementation, the method may further include the following after S404 and before S406.

Points in the input point cloud of the i-th iteration are ranked in an ascending order of Morton codes for the input point cloud of the i-th iteration. From the points with the same value of Morton codes after right shifted by K bits, a point is selected every second preset threshold according to a ranking result.

Specifically, the points are first ranked in an ascending order of Morton codes to obtain the ranking result of the input point cloud of the i-th iteration. Then the points with the same value of Morton codes after right shifted by K bits are found. Since each group of points with the same value of Morton codes after right shifted by K bits are also listed according to the ranking result, one point is selected every second preset threshold to obtained selected points.

The second preset threshold is a value set as need.

At S406, an i-th LOD layer is formed with the point selected, remaining points other than the point selected in the input point cloud of the i-th iteration are determined as an input point cloud of an (i+1)-th iteration, i is updated to i+1, and return to S403.

After the selected point is obtained, the LOD layer of this iteration (that is, the i-th LOD layer) is formed with the selected point. Therefore, after this iteration, some points in the input point cloud of this iteration are partitioned into the LOD layer, while the remaining points other than the point selected in the input point cloud of this iteration are determined as the input point cloud of the (i+1)-th iteration. Then i is updated to i+1, and S403 is performed again.

As can be seen, in implementations of this application, points adjacent in space can be found by calculating the Morton codes for the input point cloud of the i-th iteration and shifting the Morton codes right by certain bits. One or more points are selected from each group of adjacent points to form the LOD layer. As such, spatial distribution of the point cloud can be taken into consideration for the partitioned LOD layers, which facilitates to improve the prediction accuracy of neighbor nodes.

At S407, a first to (i−1)-th LOD layers are determined as LOD layers after partition of the point cloud to-be-partitioned based on a determination that the number of points in the input point cloud of the i-th iteration is equal to 0.

In addition, when the number of points in the input point cloud of the i-th iteration is equal to 0, the point cloud to-be-partitioned have been traversed completely. Therefore, the iteration may end, and the first to (i−1)-th LOD layers are determined as LOD layers after partition of the point cloud to-be-partitioned.

In addition, in order to obtain partitioned LOD layers, in an optional implementation, when i is greater than or equal to a first preset threshold, after forming the i-th LOD layer with the point selected, determining remaining points other than the point selected in the input point cloud of the i-th iteration as the input point cloud of the (i+1)-th iteration, and updating i to i+1, the method may further include the following.

A LOD layer is obtained by partitioning using a preset distance-based LOD partition algorithm according to the input point cloud of the i-th iteration. The LOD layer obtained by partition and the first to (i−1)-th LOD layers are determined as LOD layers after partition of the point cloud to-be-partitioned.

That is, with the iteration method in implementations of this application, when the number of iteration i is greater than or equal to the first preset threshold, for remaining points that have not been partitioned, the distance-based LOD partition algorithm or a fixed sampling rate-based LOD partition algorithm may be used for partition to obtain LOD layers, which is not specifically limited in implementations of this application.

When the number of iteration i is greater than or equal to the first preset threshold, after partition of this iteration is completed and the number of iteration is updated to i+1, according to the input point cloud of the i-th iteration, the preset distance-based LOD partition algorithm or the fixed sampling rate-based LOD partition algorithm may be invoked to partition the input point cloud of the i-th iteration to obtain the LOD layer. Finally, the first to (i−1)-th LOD layers previously obtained and the LOD layer obtained by partition are determined as the LOD layers after partition of the point cloud to-be-partitioned.

Figure 4B:
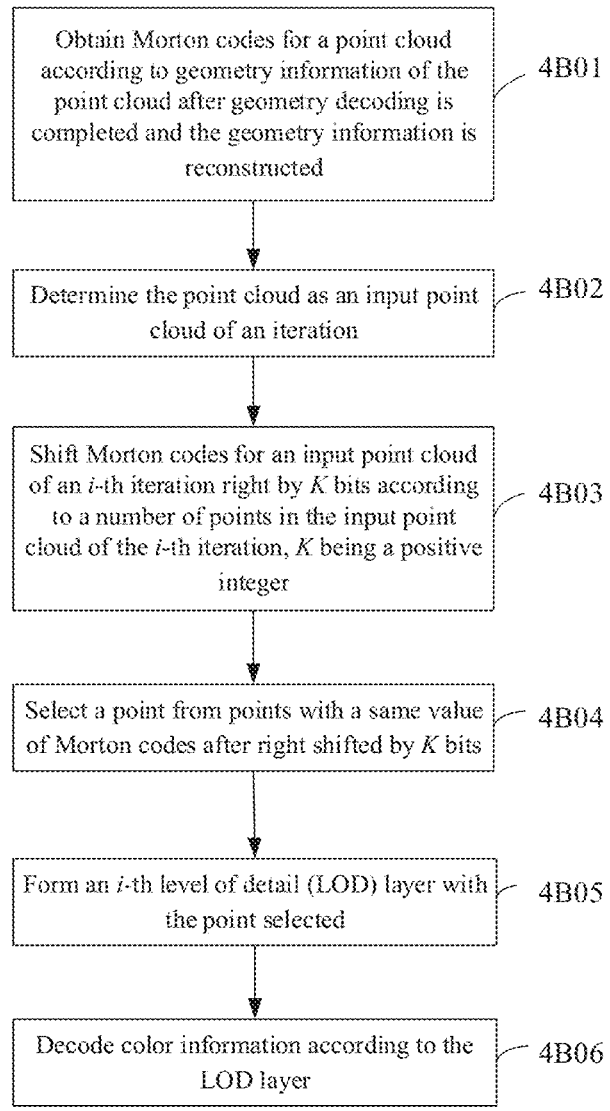
FIG. 4B is a schematic flowchart of a point cloud decoding method provided in implementations of this application.

Referring to FIG. 4B, FIG. 4B is a schematic flowchart of a point cloud decoding method provided in implementations of the disclosure. The method may be performed by a decoder. The method starts from operations at 4B01.

At 4B01, Morton codes for a point cloud are obtained according to geometry information of the point cloud, after geometry decoding is completed and the geometry information is reconstructed.

At 4B02, the point cloud is determined as an input point cloud of an iteration.

At 4B03, Morton codes for an input point cloud of an i-th iteration are shifted right by K bits according to a number of points in the input point cloud of the i-th iteration, where K is a positive integer.

At 4B04, a point is selected from points with a same value of Morton codes after right shifted by K bits.

At 4B05, an i-th level of detail (LOD) layer is formed with the point selected.

At 4B06, color information is decoded according to the LOD layer.

Figure 4C:
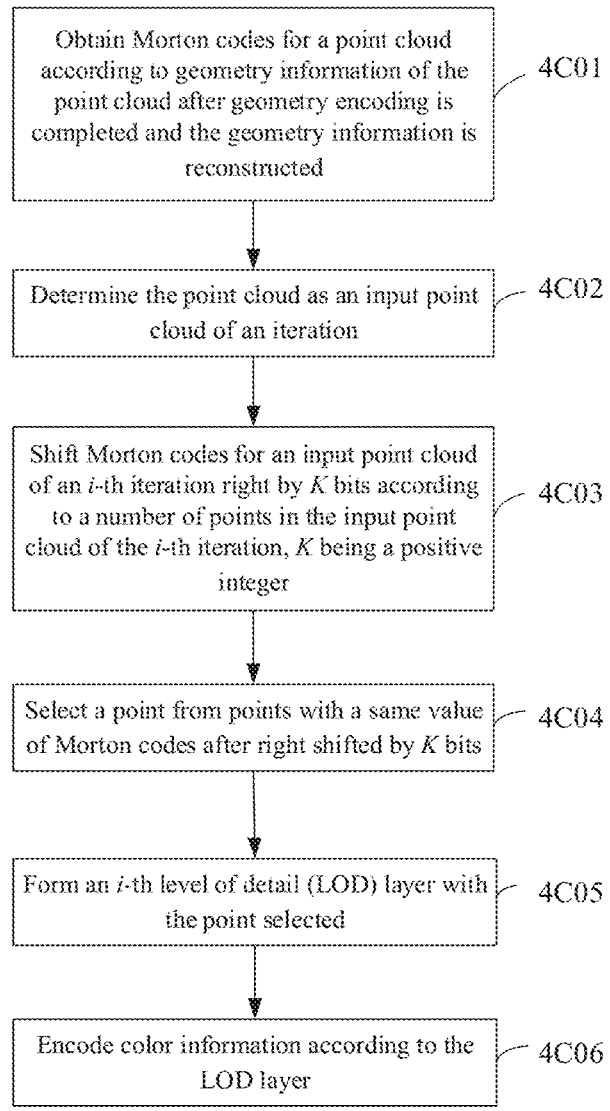
FIG. 4C is a schematic flowchart of a point cloud encoding method provided in implementations of this application.

Referring to FIG. 4C, FIG. 4C is a schematic flowchart of a point cloud encoding method provided in implementations of the disclosure. The method may be performed by an encoder. The method starts from operations at 4C01.

At 4C01, Morton codes for a point cloud are obtained according to geometry information of the point cloud, after geometry encoding is completed and the geometry information is reconstructed.

At 4C02, the point cloud is determined as an input point cloud of an iteration.

At 4C03, Morton codes for an input point cloud of an i-th iteration are shifted right by K bits according to a number of points in the input point cloud of the i-th iteration, where K is a positive integer.

At 4C04, a point is selected from points with a same value of Morton codes after right shifted by K bits.

At 4C05, an i-th level of detail (LOD) layer is formed with the point selected.

At 4C06, color information is encoded according to the LOD layer.

An example is given below to illustrate the partition method described in one or more of the above implementations.

Figure 5:
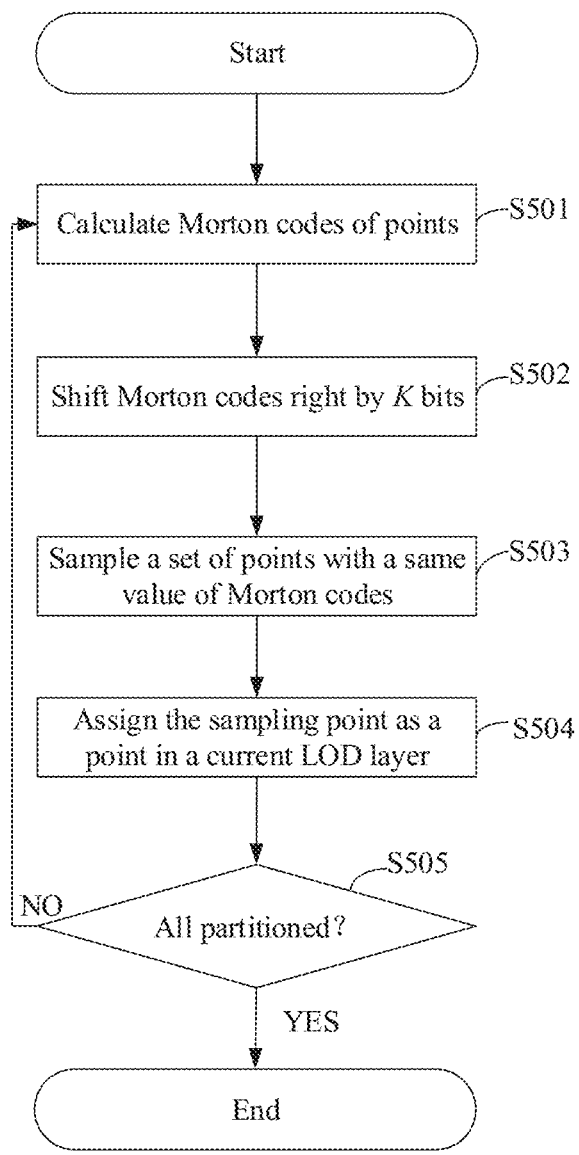
FIG. 5 is a schematic flowchart of an example of an optional partition method provided in implementations of this application.

FIG. 5 is a schematic flowchart of an example of an optional partition method provided in implementations of this application. As illustrated in FIG. 5, the partition method may be applied to an encoder or a decoder. In this example, the partition method is applied to the encoder. The partition method may include the following.

At S501, Morton codes are calculated for an obtained point cloud to-be-encoded.

Specifically, assume that the point cloud to-be-encoded contains N points each denoted as P[i]. A Morton code M[i] of each point P[i] is calculated, where i=0, 1, . . . , N−1. The Morton codes for the point cloud to-be-encoded are ranked in an ascending order.

At S502, the Morton codes are right shifted by K bits.

Specifically, by shifting the Morton code of each point in the point cloud to-be-encoded right by K bits, the Morton codes corresponding to points in adjacent positions in space will be equal, because the points adjacent in terms of Morton codes are generally in adjacent positions in the geometric space. With this feature of Morton codes, the points adjacent in the space are clustered together by shifting the Morton codes of all points in the point cloud to-be-encoded in space right by K bits.

At S503, a set of points with a same value of Morton codes are sampled.

Specifically, the points with the same value of Morton code after right shifted by K bits at S502 are sampled. A point is selected from the set of points clustered together at each iteration. Reconstructed attribute values of predicted points are obtained by using attributes of predicting points to perform weighted average on attributes of predicted points based on spatial distances. Next, attribute residuals of the predicted points are obtained using the reconstructed attribute values and original attribute values. Attributes of neighbor points are predicted using the reconstructed attribute values and predicting residuals. Prediction is perform after each sampling. Thereafter, a final prediction is obtained by combining each prediction, so as to predict attributes of neighbor points remained in the point cloud to-be-encoded.

At S504, the sampling point is assigned as a point in a current LOD layer.

Specifically, the sampling point obtained at S503 is assigned as the point in the current LOD layer, and other remaining points are assigned as points in LOD layers higher than the current LOD layer. In practical, the first point in the points with the same value of Morton codes after right shifted by K bits can be assigned as the sampling point.

At S505, whether the remaining points are all traversed or partitioned is determined. If the remaining points are all traversed or partitioned, the partition of LOD layers is ended. Otherwise, return to S502 to proceed with partitioning.

In subsequent partition, on a basic of Morton codes right shifted by K bits for the point cloud to-be-encoded, the Morton codes are right shifted by K bits again. S502 to S505 are repeated until all LOD layers are partitioned or all points are traversed.

According to the above example, in LOD partition based on right shifting Morton codes, each time it only needs to shift the Morton codes corresponding to the original point cloud to the right by a certain number of bits and sample the points with equal Morton codes after right shifted. Partition of LODs using this method only takes about 20% of the coding time. Compared with the original distance-based LOD partition method, the LOD partition method based on right shifting Morton codes is much lower in time complexity, which is about ¼~⅓ of the former.

In implementations of this application, LODs are partitioned using spatial distribution and spatial distances of the point cloud by right shifting Morton codes. In this way, not only the distances in geometry space but also the distribution of the point cloud can be taken into account. In the partition process with the method of right shifting Morton codes, the number of sampling points will be reduced in a denser part of the point cloud, while the number of sampling points will be increased in a sparser part. In the sparse part, due to the long distance between points, the attribute residuals between adjacent points are generally large during prediction. If the sampling is still based on a fixed distance, the prediction residual obtained by the attribute prediction based on the neighbors will be very large, which will lead to a large attribute bit stream after compression, and will degrade the performance of the attribute after reconstruction. In the sparse part of the space, due to the long spatial geometric distance between points, the corresponding Morton code values of adjacent points are very different. Therefore, when the Morton codes are shifted to the right, there will be few points in this part clustered into one class, so that more sampling points will be obtained. In this way, in prediction based on neighbor attributes, a better prediction effect can be obtained compared to the original scheme that only considers geometric space distances.

In implementations of this application, different numbers of point sets are obtained by right shifting the Morton codes by a certain number of bits, and then sampling points in each point set are used to predict the attributes of neighbor points. Through this scheme, the distribution of the point cloud and the spatial distances between points in the point cloud can be comprehensively considered, thereby improving the effect of predicting attributes based on neighbors.

The implementations of this application can improve the reconstruction quality of the attribute part, and can reduce the coding time and computational complexity of the attribute without affecting the performance basically, as illustrated in below Table 1.

to-be-partitioned is obtained and Morton codes for the point cloud to-be-partitioned are calculated. The point cloud to-be-partitioned is determined as an input point cloud of a first iteration. At an i-th iteration, whether a number of points in an input point cloud of the i-th iteration is equal to 0 is determined, where i is a positive integer with an initial value equal to 1. Based on a determination that the number of points in the input point cloud of the i-th iteration is unequal to 0, Morton codes for the input point cloud of the i-th iteration are right shifted by K bits, where K is a positive integer. A point is selected from points with a same value of Morton codes after right shifted by K bits. An i-th LOD layer is formed with the point selected, remaining points other than the point selected in the input point cloud of the i-th iteration are determined as an input point cloud of an (i+1)-th iteration, i is updated to i+1, and return to determine whether the number of points in the input point cloud of the i-th iteration is equal to 0 at the i-th iteration. Based on a determination that the number of points in the input point cloud of the i-th iteration is equal to 0, a first to (i−1)-th LOD layers are determined as LOD layers after partition of the point cloud to-be-partitioned. That is, in implementations of this application, through iteration, Morton codes for the input point cloud of each iteration are right shifted by K bits. Thereafter, a point is selected from the points with the same value of Morton codes after right shifted by K bits, and the selected point forms the LOD layer of the current iteration. With this partition method, since points adjacent in Morton codes are generally adjacent in geometric space, the distribution of the point cloud and the spatial distances between points in the point cloud can be comprehensively considered in the LOD partition process by right shifting the Morton codes and selecting the point(s) based on the right-shifted Morton codes. As such, the partition of LOD layers obtained is based on the distribution of the point cloud and the spatial distances between points in the point cloud. In this way, the prediction accuracy of neighbor nodes based on LOD layers can be improved, thereby improving the coding efficiency.

Implementation 2

Figure 6:
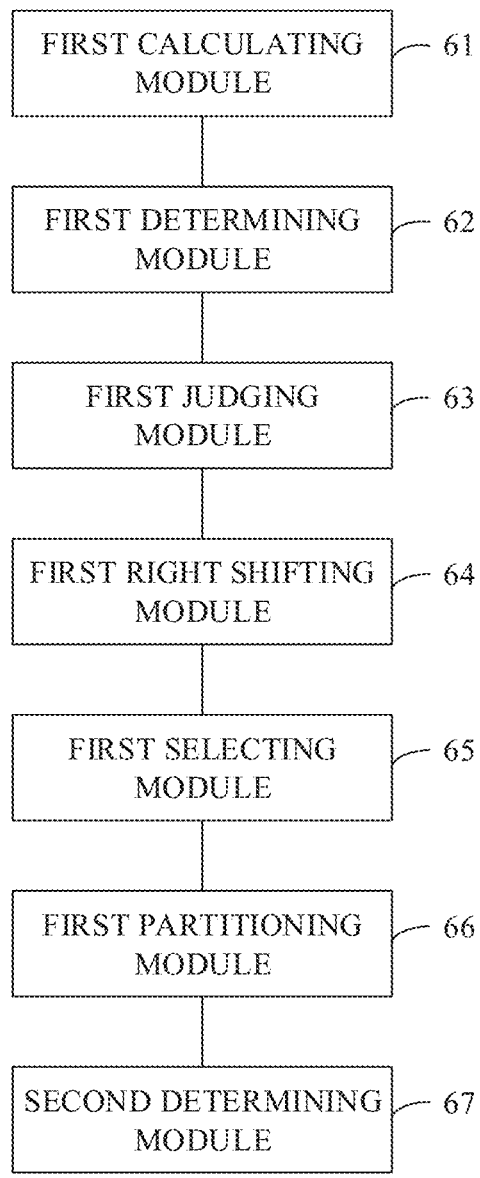
FIG. 6 is a schematic structural diagram of an optional encoder provided in implementations of this application.

Based on the same inventive concept, implementations of this application provide an encoder. FIG. 6 is a schematic

TABLE 1

| Point cloud file | Initial number of right shifted bits | BD-rate (attribute) U | BD-rate (attribute) V | Time Encoding time ratio | Time Decoding time ration |
|---|---|---|---|---|---|
| frog_00067_vox12 | 6 | −7.4% | −16.6% | 95% | 89% |
| facade_00064_vox11 | 6 | 13.3% | −4.5% | 96% | 86% |
| house_without_roof_vox12 | 6 | −3.4% | −3.3% | 88% | 78% |
| Average(average gain) | 6 | −0.8% | −8.1% | 93% | 84% |

As can be seen from Table 1, the BD-rate of the reconstructed point cloud is also significantly improved. Peak signal to noise ratio (PSNR) is an objective standard for image evaluation. The larger the PSNR, the better the image quality. BD-rate is a parameter used to measure the quality of performance. When BD-rate is negative, it means that the performance becomes better. On this basis, the larger the absolute value of BD-rate, the greater the performance gain. In addition, the partition method provided in implementations of this application reduces the time required for partitioning LODs, thereby reducing the coding time.

Implementations of this application provide a partition method. The method includes the following. A point cloud structural diagram of an optional encoder provided in implementations of this application. As illustrated in FIG. 6, the encoder includes a first calculating module 61, a first determining module 62, a first judging module 63, a first right shifting module 64, a first selecting module 65, a first partitioning module 66, and a second determining module 67.

The first calculating module 61 is configured to obtain a point cloud to-be-partitioned and calculate Morton codes for the point cloud to-be-partitioned.

The first determining module 62 is configured to determine the point cloud to-be-partitioned as an input point cloud of a first iteration.

The first judging module 63 is configured to determine whether a number of points in an input point cloud of an i-th iteration is equal to 0 at the i-th iteration, where i is a positive integer with an initial value equal to 1.

The first right shifting module 64 is configured to shift Morton codes for the input point cloud of the i-th iteration right by K bits based on a determination that the number of points in the input point cloud of the i-th iteration is unequal to 0, where K is a positive integer.

The first selecting module 65 is configured to select a point from points with a same value of Morton codes after right shifted by K bits.

The first partitioning module 66 is configured to form an i-th LOD layer with the point selected, determine remaining points in the input point cloud of the i-th iteration other than the point selected as an input point cloud of an (i+1)-th iteration, update i to i+1, and return to the first judging module 63 to determine whether the number of points in the input point cloud of the i-th iteration is equal to 0 at the i-th iteration.

The second determining module 67 is configured to determine a first to (i−1)-th LOD layers as LOD layers after partition of the point cloud to-be-partitioned based on a determination that the number of points in the input point cloud of the i-th iteration is equal to 0.

In an optional implementation, the first determining module 62 may be further configured to determine a value of K according to a distribution of the point cloud to-be-partitioned prior to shifting the Morton codes for the input point cloud of the i-th iteration right by K bits based on the determination that the number of points in the input point cloud of the i-th iteration is unequal to 0.

In an optional implementation, when i is greater than or equal to a first preset threshold, the first determining module 62 may be further configured to determine a value of K according to a number of points in the input point cloud of the i-th iteration and a distribution of the input point cloud of the i-th iteration prior to shifting the Morton codes for the input point cloud of the i-th iteration right by K bits based on the determination that the number of points in the input point cloud of the i-th iteration is unequal to 0.

In an optional implementation, when i is greater than or equal to the first preset threshold, after forming the i-th LOD layer with the point selected, determining remaining points other than the point selected in the input point cloud of the i-th iteration as the input point cloud of the (i+1)-th iteration, and updating i to i+1, the encoder may be further configured to obtain a LOD layer by partitioning using a preset distance-based LOD partition algorithm according to the input point cloud of the i-th iteration, and determine the LOD layer obtained by partition and the first to (i−1)-th LOD layers as LOD layers after partition of the point cloud to-be-partitioned.

In an optional implementation, the first selecting module 65 may be specifically configured to rank points in the input point cloud of the i-th iteration in an ascending order of Morton codes for the input point cloud of the i-th iteration, and select a point ranked first from the points with the same value of Morton codes after right shifted by K bits.

In an optional implementation, the first selecting module 65 may be specifically configured to determine a center of mass of the points with the same value of Morton codes after right shifted by K bits, and determine, from the points with the same value of Morton codes after right shifted by K bits, a point closest to the center of mass as the point selected.

In an optional implementation, the first selecting module 65 may be specifically configured to determine a corresponding selection number according to a number of points with the same value of Morton codes after right shifted by K bits, and select, from the points with the same value of Morton codes after right shifted by K bits, the selection number of points according to the corresponding selection number.

In an optional implementation, the first selecting module 65 may be specifically configured to rank points in the input point cloud of the i-th iteration in an ascending order of Morton codes for the input point cloud of the i-th iteration, and select, from the points with the same value of Morton codes after right shifted by K bits, a point every second preset threshold according to a ranking result.

In an optional implementation, the first determining module 62 may be further configured to shift the Morton codes for the point cloud to-be-partitioned right by N bits and group points with the same value of Morton codes after right shifted by N bits into a point cloud group, and determine each point cloud group as the input point cloud of the first iteration respectively, where N is a positive integer.

Figure 7:
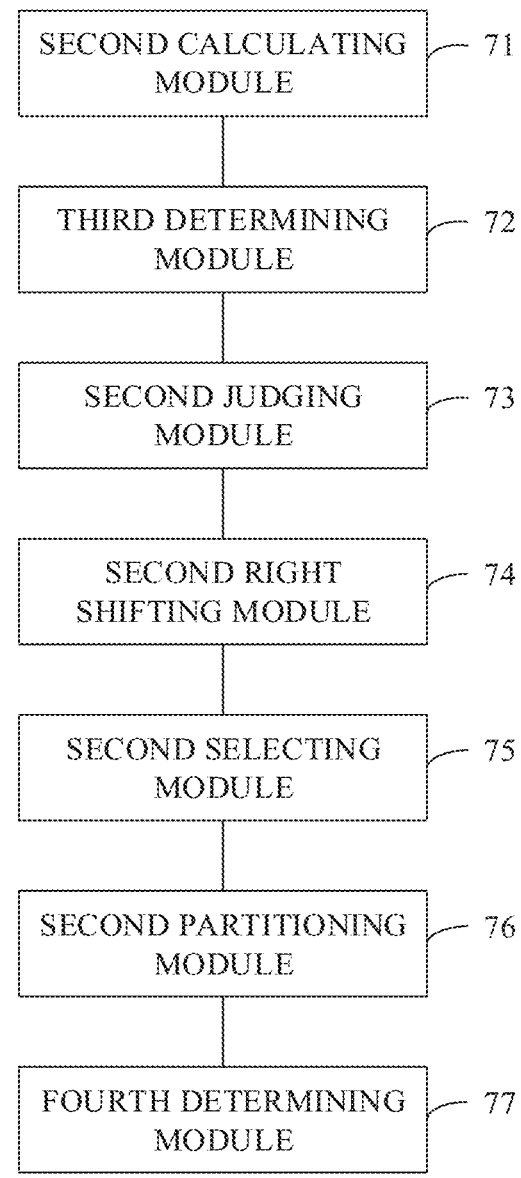
FIG. 7 is a schematic structural diagram of an optional decoder provided in implementations of this application.

Implementations of this application provide a decoder. FIG. 7 is a schematic structural diagram of an optional decoder provided in implementations of this application. As illustrated in FIG. 7, the decoder includes a second calculating module 71, a third determining module 72, a second judging module 73, a second right shifting module 74, a second selecting module 75, a second partitioning module 76, and a fourth determining module 77.

The second calculating module 71 is configured to obtain a point cloud to-be-partitioned and calculate Morton codes for the point cloud to-be-partitioned.

The third determining module 72 is configured to determine the point cloud to-be-partitioned as an input point cloud of a first iteration.

The second judging module 73 is configured to determine whether a number of points in an input point cloud of an i-th iteration is equal to 0 at the i-th iteration, where i is a positive integer with an initial value equal to 1.

The second right shifting module 74 is configured to shift Morton codes for the input point cloud of the i-th iteration right by K bits based on a determination that the number of points in the input point cloud of the i-th iteration is unequal to 0, where K is a positive integer.

The second selecting module 75 is configured to select a point from points with a same value of Morton codes after right shifted by K bits.

The second partitioning 76 module is configured to form an i-th LOD layer with the point selected, determine remaining points in the input point cloud of the i-th iteration other than the point selected as an input point cloud of an (i+1)-th iteration, update i to i+1, and return to the second judging module 73 to determine whether the number of points in the input point cloud of the i-th iteration is equal to 0 at the i-th iteration.

The fourth determining module 77 is configured to determine a first to (i−1)-th LOD layers as LOD layers after partition of the point cloud to-be-partitioned based on a determination that the number of points in the input point cloud of the i-th iteration is equal to 0.

In an optional implementation, the third determining module 72 may be further configured to determine a value of K according to a distribution of the point cloud to-be-partitioned prior to shifting the Morton codes for the input point cloud of the i-th iteration right by K bits based on the determination that the number of points in the input point cloud of the i-th iteration is unequal to 0.

In an optional implementation, when i is greater than or equal to a first preset threshold, the third determining module 72 may be further configured to determine a value of K according to a number of points in the input point cloud of the i-th iteration and a distribution of the input point cloud of the i-th iteration prior to shifting the Morton codes for the input point cloud of the i-th iteration right by K bits based on the determination that the number of points in the input point cloud of the i-th iteration is unequal to 0.

In an optional implementation, when i is greater than or equal to a first preset threshold, after forming the i-th LOD layer with the point selected, determining remaining points other than the point selected in the input point cloud of the i-th iteration as the input point cloud of the (i+1)-th iteration, and updating i to i+1, the decoder may be further configured to obtain a LOD layer by partitioning using a preset distance-based LOD partition algorithm according to the input point cloud of the i-th iteration, and determine the LOD layer obtained by partition and the first to (i–1)-th LOD layers as LOD layers after partition of the point cloud to-be-partitioned.

In an optional implementation, the second selecting module 75 may be specifically configured to rank points in the input point cloud of the i-th iteration in an ascending order of Morton codes for the input point cloud of the i-th iteration, and select a point ranked first from the points with the same value of Morton codes after right shifted by K bits.

In an optional implementation, the second selecting module 75 may be specifically configured to determine a center of mass of the points with the same value of Morton codes after right shifted by K bits, and determine, from the points with the same value of Morton codes after right shifted by K bits, a point closest to the center of mass as the point selected.

In an optional implementation, the second selecting module 75 may be specifically configured to determine a corresponding selection number according to a number of points with the same value of Morton codes after right shifted by K bits, and select, from the points with the same value of Morton codes after right shifted by K bits, the selection number of points according to the corresponding selection number.

In an optional implementation, the second selecting module 75 may be specifically configured to rank points in the input point cloud of the i-th iteration in an ascending order of Morton codes for the input point cloud of the i-th iteration, and select, from the points with the same value of Morton codes after right shifted by K bits, a point every second preset threshold according to a ranking result.

In an optional implementation, the third determining module 72 may be further configured to shift the Morton codes for the point cloud to-be-partitioned right by N bits and group points with the same value of Morton codes after right shifted by N bits into a point cloud group, and determine each point cloud group as the input point cloud of the first iteration respectively, where N is a positive integer.

Figure 8:
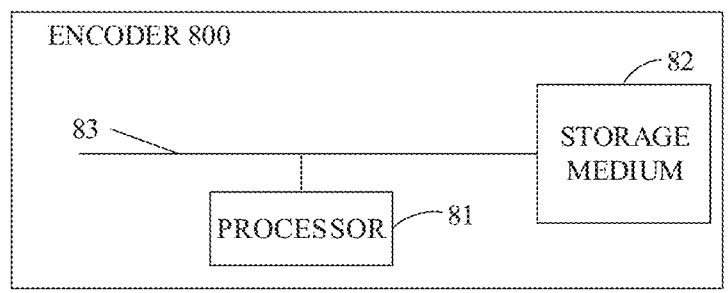
FIG. 8 is a schematic structural diagram of another optional encoder provided in implementations of this application.

FIG. 8 is a schematic structural diagram of another optional encoder provided in implementations of this application. As illustrated in FIG. 8, the encoder 800 proposed in the implementations of this application may further include a processor 81 and a storage medium 82 storing instructions executable by the processor 81. The storage medium 82 relies on the processor 81 to perform operations through the communication bus 83. When the instructions are executed by the processor 81, any of the methods described in one or more of the above implementations is executed.

It should be noted that, in practical application, various components in the encoder 800 are coupled together through the communication bus 83. It can be understood that the communication bus 83 is configured to realize connection and communication between these components. In addition to the data bus, the communication bus 83 also includes a power bus, a control bus, and a status signal bus. However, for the sake of clarity, the various buses are designated as communication bus 83 in FIG. 8.

Figure 9:
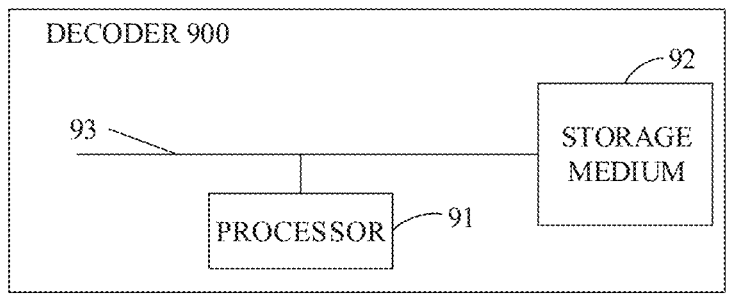
FIG. 9 is a schematic structural diagram of another optional decoder provided in implementations of this application.

FIG. 9 is a schematic structural diagram of an optional decoder provided in implementations of this application. As illustrated in FIG. 9, the decoder 900 proposed in the implementations of this application may further include a processor 91 and a storage medium 92 storing instructions executable by the processor 91. The storage medium 92 relies on the processor 91 to perform operations through the communication bus 93. When the instructions are executed by the processor 91, any of the methods described in one or more of the above implementations is executed.

It should be noted that, in practical application, various components in the decoder 900 are coupled together through the communication bus 93. It can be understood that the communication bus 93 is configured to realize connection and communication between these components. In addition to the data bus, the communication bus 93 also includes a power bus, a control bus, and a status signal bus. However, for the sake of clarity, the various buses are designated as communication bus 93 in FIG. 9.

Implementations of this application provide a computer storage medium storing executable instructions, and when the executable instructions are executed by one or more processors, the processors execute any of the methods described in one or more of the foregoing implementations.

It can be understood that the memory in implementations of this application may be a volatile memory or a non-volatile memory, or may include both volatile and non-volatile memory. The non-volatile memory may be a read-only memory (ROM), a programmable read-only memory (PROM), an erasable programmable read-only memory (EPROM), an electrically erasable programmable read-only memory (Electrically EPROM, EEPROM), or a flash memory. The volatile memory may be a random access memory (RAM), which acts as an external cache. By way of example and not limitation, many forms of RAM are available, such as static RAM (SRAM), dynamic RAM (DRAM), synchronous DRAM (SDRAM), double data rate synchronous dynamic random access memory (Double Data Rate SDRAM, DDRSDRAM), enhanced synchronous dynamic random access memory (Enhanced SDRAM, ESDRAM), synchronous link dynamic random access memory (Synchlink DRAM, SLDRAM), and direct rambus RAM (DR-RAM). The memory of the systems and methods described herein is intended to include, but not be limited to, these and any other suitable types of memory.

The processor may be an integrated circuit chip with signal processing capabilities. In the implementation process, each step of the above-mentioned method can be completed by a hardware integrated logic circuit in a processor or an instruction in the form of software. The above-mentioned processor may be a general-purpose processor, a digital signal processor (DSP), an application specific integrated circuit (ASIC), a field programmable gate array (FPGA), or other programmable logic devices, discrete gate or transistor logic devices, discrete hardware components. The methods, steps, and logic block diagrams disclosed in the implementations of this application can be implemented or executed. The general purpose processor may be a microprocessor or the processor may be any conventional processor or the like. The steps of the method disclosed in conjunction with the implementations of this application may be directly embodied as executed by a hardware coding processor, or executed by a combination of hardware and software modules in the coding processor. The software modules may be located in random access memory, flash memory, read-only memory, programmable read-only memory or electrically erasable programmable memory, registers and other storage media mature in the art. The storage medium is located in the memory, and the processor reads the information in the memory, and completes the steps of the above method in combination with its hardware.

It will be appreciated that the implementations described herein may be implemented in hardware, software, firmware, middleware, microcode, or a combination thereof. For hardware implementation, the processing unit can be implemented in one or more ASICs, DSPs, DSP devices (DSPDs), programmable logic devices (PLDs), FPGAs, general purpose processors, controllers, microcontrollers, microprocessors, other electronic units for performing the functions described in this application, or a combination thereof.

For a software implementation, the techniques described herein may be implemented through modules (e.g., procedures, functions, etc.) that perform the functions described herein. Software codes may be stored in memory and executed by a processor. The memory can be implemented in the processor or external to the processor.

It should be noted herein that the terms "including", "comprising" or any other variation thereof are intended to encompass non-exclusive inclusion, such that a process, method, article or device comprising a series of elements includes not only those elements, but also other elements not explicitly listed or inherent to such a process, method, article or device. Without further limitation, an element qualified by the phrase "comprising a . . . " does not preclude the presence of additional identical elements in the process, method, article or device that includes the element.

The above-mentioned serial numbers of the implementations of this application are only for description, and do not represent the advantages or disadvantages of the implementations.

From the description of the above implementations, those skilled in the art can clearly understand that the methods of the above implementations can be implemented by means of software plus a necessary general hardware platform, and of course hardware can also be used, but in many cases the former is better implementation. Based on this understanding, the technical solutions of this application can be embodied in the form of software products in essence or the parts that make contributions to the prior art, and the computer software products are stored in a storage medium (such as ROM/RAM, magnetic disk, CD-ROM), including several instructions to enable a terminal (which may be a mobile phone, a computer, a server, or a network device, etc.) to execute the methods described in the various implementations of this application.

The implementations of the present application have been described above in conjunction with the accompanying drawings, but this application is not limited to the above-mentioned specific implementations, which are merely illustrative rather than restrictive. Under the inspiration of this application, many forms can be made without departing from the scope of protection of the purpose of this application and the claims, which all fall within the protection of this application.

INDUSTRIAL APPLICABILITY

Implementations of this application provide coding methods, an encoder, a decoder, and a computer storage medium. A point cloud to-be-partitioned is obtained and Morton codes for the point cloud to-be-partitioned are calculated. The point cloud to-be-partitioned is determined as an input point cloud of a first iteration. At an i-th iteration, whether a number of points in an input point cloud of the i-th iteration is equal to 0 is determined, where i is a positive integer with an initial value equal to 1. Based on a determination that the number of points in the input point cloud of the i-th iteration is unequal to 0, Morton codes for the input point cloud of the i-th iteration are right shifted by K bits, where K is a positive integer. A point is selected from points with a same value of Morton codes after right shifted by K bits. An i-th level of detail (LOD) layer is formed with the point selected, remaining points other than the point selected in the input point cloud of the i-th iteration are determined as an input point cloud of an (i+1)-th iteration, i is updated to i+1, and return to determine whether the number of points in the input point cloud of the i-th iteration is equal to 0 during the i-th iteration. Based on a determination that the number of points in the input point cloud of the i-th iteration is equal to 0, a first to (i−1)-th LOD layers are determined as LOD layers after partition of the point cloud to-be-partitioned. As such, a prediction accuracy of neighbor nodes based on LOD layers can be improved, thereby improving coding efficiency.

What is claimed is:

1. A point cloud decoding method, applied for a decoder, comprising:
    obtaining Morton codes for a point cloud according to geometry information of the point cloud after geometry decoding is completed and the geometry information is reconstructed;
    determining a value of K according to a distribution of the point cloud, K being a positive integer;
    determining the point cloud as an input point cloud of an iteration;
    shifting Morton codes for an input point cloud of an i-th iteration right by K bits according to a number of points in the input point cloud of the i-th iteration;
    forming an i-th level of detail (LOD) layer with a point selected after shifting the Morton codes; and
    decoding color information according to the LOD layer.

2. The method of claim 1, further comprising:
    selecting the point from points with a same value of Morton codes after right shifted by K bits.

3. The method of claim 1, further comprising:
    when i is greater than or equal to a first preset threshold, prior to shifting the Morton codes for the input point cloud of the i-th iteration right by K bits according to the number of points in the input point cloud of the i-th iteration:
        determining a value of K according to a number of points in the input point cloud of the i-th iteration and a distribution of the input point cloud of the i-th iteration.

4. The method of claim 1, further comprising:
    when i is greater than or equal to a first preset threshold, after forming the i-th LOD layer with the point selected:
        obtaining a LOD layer by partitioning using a preset distance-based LOD partition algorithm according to the input point cloud of the i-th iteration; and determining the LOD layer obtained by partition and the first to (i−1)-th LOD layers as LOD layers after partition of the point cloud.

5. The method of claim 2, wherein selecting the point from points with the same value of Morton codes after right shifted by K bits comprises:
ranking points in the input point cloud of the i-th iteration in an ascending order of Morton codes for the input point cloud of the i-th iteration; and
selecting a point ranked first from the points with the same value of Morton codes after right shifted by K bits.

6. The method of claim 2, wherein selecting the point from points with the same value of Morton codes after right shifted by K bits comprises:
determining a center of mass of the points with the same value of Morton codes after right shifted by K bits; and
determining, from the points with the same value of Morton codes after right shifted by K bits, a point closest to the center of mass as the point selected.

7. The method of claim 2, further comprising:
after shifting Morton codes for the input point cloud of the i-th iteration right by K bits according to the number of points in the input point cloud of the i-th iteration and prior to forming the i-th LOD layer with the point selected:
determining a corresponding selection number according to a number of points with the same value of Morton codes after right shifted by K bits; and
selecting, from the points with the same value of Morton codes after right shifted by K bits, the selection number of points according to the corresponding selection number.

8. The method of claim 2, further comprising:
after shifting Morton codes for the input point cloud of the i-th iteration right by K bits according to the number of points in the input point cloud of the i-th iteration and prior to forming the i-th LOD layer with the point selected:
ranking points in the input point cloud of the i-th iteration in an ascending order of Morton codes for the input point cloud of the i-th iteration; and
selecting, from the points with the same value of Morton codes after right shifted by K bits, a point every second preset threshold according to a ranking result.

9. The method of claim 1, further comprising:
after obtaining the Morton codes for the point cloud and prior to shifting Morton codes for the input point cloud of the i-th iteration right by K bits according to the number of points in the input point cloud of the i-th iteration:
shifting the Morton codes for the point cloud right by N bits and grouping points with a same value of Morton codes after right shifted by N bits into a point cloud group, N being a positive integer; and
determining each point cloud group as the input point cloud of the iteration respectively.

10. A point cloud encoding method, applied for an encoder, comprising:
obtaining Morton codes for a point cloud according to geometry information of the point cloud after geometry encoding is completed and the geometry information is reconstructed;
determining a value of K according to a distribution of the point cloud, K being a positive integer;
determining the point cloud as an input point cloud of an iteration;
shifting Morton codes for an input point cloud of an i-th iteration right by K bits according to a number of points in the input point cloud of the i-th iteration;
forming an i-th level of detail (LOD) layer with a point selected after shifting the Morton codes; and
encoding color information according to the LOD layer.

11. The method of claim 10, further comprising:
selecting the point from points with a same value of Morton codes after right shifted by K bits.

12. The method of claim 10, further comprising:
when i is greater than or equal to a first preset threshold, prior to shifting the Morton codes for the input point cloud of the i-th iteration right by K bits according to the number of points in the input point cloud of the i-th iteration:
determining a value of K according to a number of points in the input point cloud of the i-th iteration and a distribution of the input point cloud of the i-th iteration.

13. The method of claim 10, further comprising:
when i is greater than or equal to a first preset threshold, after forming the i-th LOD layer with the point selected:
obtaining a LOD layer by partitioning using a preset distance-based LOD partition algorithm according to the input point cloud of the i-th iteration; and
determining the LOD layer obtained by partition and the first to (i−1)-th LOD layers as LOD layers after partition of the point cloud.

14. The method of claim 11, wherein selecting the point from points with the same value of Morton codes after right shifted by K bits comprises:
ranking points in the input point cloud of the i-th iteration in an ascending order of Morton codes for the input point cloud of the i-th iteration; and
selecting a point ranked first from the points with the same value of Morton codes after right shifted by K bits.

15. The method of claim 11, wherein selecting the point from points with the same value of Morton codes after right shifted by K bits comprises:
determining a center of mass of the points with the same value of Morton codes after right shifted by K bits; and
determining, from the points with the same value of Morton codes after right shifted by K bits, a point closest to the center of mass as the point selected.

16. The method of claim 11, further comprising:
after shifting Morton codes for the input point cloud of the i-th iteration right by K bits according to the number of points in the input point cloud of the i-th iteration and prior to forming the i-th LOD layer with the point selected:
determining a corresponding selection number according to a number of points with the same value of Morton codes after right shifted by K bits; and
selecting, from the points with the same value of Morton codes after right shifted by K bits, the selection number of points according to the corresponding selection number.

17. An encoder, comprising:
a processor; and
a memory storing a computer program which, when executed by the processor, causes the processor to:
obtain Morton codes for a point cloud according to geometry information of the point cloud after geometry encoding is completed and the geometry information is reconstructed;

determine a value of K according to a distribution of the point cloud, K being a positive integer;

determine the point cloud as an input point cloud of an iteration;

shift Morton codes for an input point cloud of an i-th iteration right by K bits according to a number of points in the input point cloud of the i-th iteration;

form an i-th level of detail (LOD) layer with a point selected after the Morton codes are shifted; and encode color information according to the LOD layer.

18. The encoder of claim 17, wherein the computer program, when executed by the processor, further causes the processor to:

select the point from points with a same value of Morton codes after right shifted by K bits.

19. A decoder, comprising:

a processor; and a memory storing a computer program which, when executed by the processor, causes the processor to:

obtain Morton codes for a point cloud according to geometry information of the point cloud after geometry decoding is completed and the geometry information is reconstructed;

determine a value of K according to a distribution of the point cloud, K being a positive integer;

determine the point cloud as an input point cloud of an iteration;

shift Morton codes for an input point cloud of an i-th iteration right by K bits according to a number of points in the input point cloud of the i-th iteration, K being a positive integer;

form an i-th level of detail (LOD) layer with a point selected after the Morton codes are shifted; and decode color information according to the LOD layer.

20. The decoder of claim 19, wherein the computer program, when executed by the processor, further causes the processor to:

select the point from points with a same value of Morton codes after right shifted by K bits.

* * * * *